Figure 1:
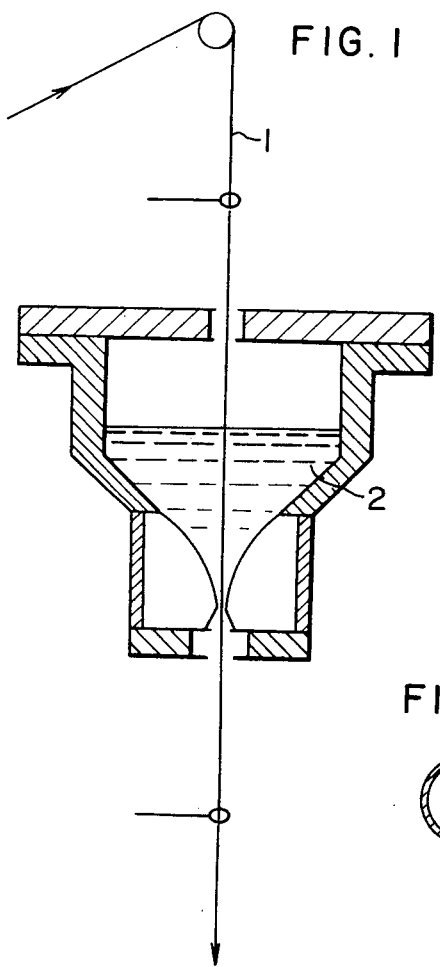

United States Patent
Chimura et al.

[11] 3,930,103
[45] Dec. 30, 1975

[54] LIGHT TRANSMITTING FIBERS

[75] Inventors: Kazuya Chimura; Shunichi Takashima; Ryuichi Nakazono; Masao Kawashima; Hiroyuki Ota, all of Ohtake; Takashi Kaneko, Tokyo; Kenichi Sakunaga, Ohtake, all of Japan

[73] Assignee: Mitsubishi Rayon Co., Ltd., Tokyo, Japan

[22] Filed: June 19, 1974

[21] Appl. No.: 480,860

[30] Foreign Application Priority Data
June 21, 1973 Japan................. 48-70125

[52] U.S. Cl................. 428/361; 264/1; 264/290 R; 264/291; 350/96 R; 427/163; 428/373; 428/378; 428/910; 428/918
[51] Int. Cl.² . G02B 1/04; G02B 5/16; B32B 27/02; B32B 27/28
[58] Field of Search....... 350/96 R; 264/290 R, 291, 264/1; 161/175, 176, 402, 408–410, 1; 428/361, 373, 374, 378, 902, 903, 910, 918; 427/161, 163

[56] References Cited
UNITED STATES PATENTS

| | | | |
|---|---|---|---|
| 2,479,935 | 8/1949 | Johnson | 264/1 |
| 3,556,635 | 1/1971 | Schrenk et al. | 350/96 R |
| 3,647,612 | 3/1972 | Schrenk et al. | 161/165 |
| 3,681,189 | 8/1972 | Matsui et al. | 161/175 |
| 3,691,001 | 9/1972 | Takahashi et al. | 161/176 X |
| 3,742,107 | 6/1973 | Hawkins | 264/1 X |

Primary Examiner—Harold Ansher
Attorney, Agent, or Firm—Armstrong, Nikaido & Wegner

[57] ABSTRACT

Light transmitting fibers having core-sheath structure which comprises a polymer mainly composed of methyl methacrylate containing at least 60 mol % of methyl methacrylate as a core component and a vinylidene fluoride-tetrafluoroethylene copolymer containing 60 to 80 mol % of vinylidene fluoride as a sheath component have a high light transmissibility and high bending strength and abrasion resistance.

9 Claims, 3 Drawing Figures

LIGHT TRANSMITTING FIBERS

The present invention relates to flexible light transmitting fibers comprising core and sheath components.

Hitherto, light transmitting fibers have been produced from glass and widely utilized for industry, medical treatment, ornament or transmission of information. However, the light transmitting fibers made of glass have the defects that they are expensive, heavy in weight and relatively low in flexibility. Therefore, recently various attempts have been made to produce them from synthetic high polymers.

The great characteristic of using synthetic high polymers is that light transmitting fibers which are light in weight and have high flexibility may be produced. A general method for producing such light transmitting fibers from synthetic high polymers comprises producing fibers of sheath and core structure in which the core comprises a polymer having a high refractive index and a good transmittance and the sheath comprises a transparent polymer having lower refractive index than said polymer of the core. The fibers thus obtained transmit light due to total reflection of light at interface of sheath and core. Therefore, the greater the difference in refractive index of the polymers of core and sheath is, the better the light transmission is.

As the polymers of high light transmittance, amorphous materials are preferred and polymethyl methacrylate and polystyrene are especially important. Polymethyl methacrylate is excellent in transparency and is extremely useful as optical materials, but has a relatively low refractive index of 1.48 to 1.50. Therefore, when this resin is used as a core component, a resin of low refractive index must be used as a sheath component.

In production of light transmitting fibers, it is fundamentally important to make great the difference in refractive index of core and sheath components as mentioned above. However, it is also necessary to take into consideration other factors such as adhesion state at interface of sheath and core components, influence of incorporation of dusts, bubbles, carbides of the polymer, etc., and mechanical strength of the polymers constituting the light transmitting fibers.

In this sense, attention should be given to the light transmitting fibers comprising combination of polystyrene resin and polymethyl methacrylate resin or combination of polymethyl methacrylate resin and fluorine-containing polymethacrylate resin having the general formula

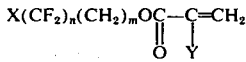

(wherein X is H, F or Cl, Y is H or $CH_3$, $n$ is an integer of 2 to 10 and $m$ is an integer of 1 to 6) as proposed in Japanese Pat. No. 8978/68.

However, according to the inventors, it has become clear that as the core material of light transmitting fibers, polymethyl methacrylate resin is more preferable than polystyrene resin in that the former is superior to the latter in transmissibility of light of wide wave length, in mechanical strength and in dimensional stability for heat. However, the fluorine-containing polymethacrylate resins represented by said general formula as shown in Japanese Pat. No. 8978/68 have the problems in mechanical strength and in applicability to melt-spinning process which is one of the important methods for production of light transmitting fibers. These problems are attributable to the fact that said fluorine-containing polymethacrylate resins have much lower melt viscosity than polymethyl methacrylate resins and furthermore are not sufficient in resistance to thermal decomposition at a high temperature of 190° to 260°C at melt spinning.

As the result of the inventors' intensive research on development of light transmitting fibers which are easily shapable into fibers and are excellent in light transmissibility and mechanical strength, it has been found that said problems are improved by employing polymethyl methacrylate polymer as core component and a copolymer of vinylidene fluoride and tetrafluoroethylene in a certain ratio as sheath component and thus light transmitting fibers having excellent properties can be produced.

That is, the gist of the present invention resides in light transmitting fibers having sheath-core structure in which a polymer mainly composed of methyl methacrylate (containing at least 60 mol % of methyl methacrylate) is used as the core component and a vinylidene fluoride-tetrafluoroethylene copolymer containing 60 to 80 mol % of vinylidene fluoride is used as the sheath component.

The characteristics of the present invention may be summarized as follows:

1. A copolymer having a small refractive index of 1.39 to 1.41 is used as the copolymer of sheath component.
2. Adhesiveness between core component polymer and sheath component polymer is high.
3. Melt viscosity of sheath component copolymer can easily be allowed to close to that of core component. Moreover, heat stability of the sheath copolymer is high. Therefore, light transmitting fibers can easily be produced by melt composite spinning.
4. The sheath component copolymer is highly soluble in a volatile organic solvent and application of sheath component can be easily accomplished by coating method.
5. Bending strength and abrasion strength of sheath component copolymers are especially excellent.
6. The fibers are excellent in light transmissibility.

The characteristics of the present invention will be explained in more detail.

In case of light transmitting fibers having core-sheath structure, light is transmitted utilizing total reflection at interface between sheath and core components. Therefore, fundamentally, the smaller critical angle of light at interface between sheath and core components is more effective for transmission of light. Said critical angle $\theta$ is shown by the following formula (1) in which $n_1$ and $n_2$ are refractive index of core and sheath components, respectively. As is clear from this formula, it is necessary that refractive index of sheath component is sufficiently smaller than that of core component.

$$\sin \theta = n_2/n_1 \qquad (1)$$

Since refractive index of polymethyl methacrylate polymer is 1.48 to 1.50, that of sheath component polymer is preferably less than 1.42.

It has been known that polytetrafluoroethylene has extremely low refractive index of about 1.35. However, said material is crystalline and is extremely inferior in workability by melting treatment and moreover in adhesiveness to polymethyl methacrylate polymer. Therefore, polytetrafluoroethylene cannot be used as sheath component of light transmitting fibers.

Furthermore, vinylidene fluoride polymer has a relatively low refractive index of 1.42, but it is also crystalline and is considerably inferior in adhesiveness to polymethyl methacrylate polymer. Therefore, vinylidene fluoride polymer may be used with difficulty.

The inventors have made research on improvement of fluorine-containing polymers such as polytetrafluoroethylene and vinylidene fluoride polymer in increase of adhesiveness to polymethyl methacrylate polymer while maintaining heat resistance, chemical stability and excellent mechanical strength of said fluorine-containing polymers. As the result, it has been found that a vinylidene fluoride-tetrafluoroethylene copolymer containing 60 to 80 mol % of vinylidene fluoride has markedly lowered crystallinity and is nearly amorphous and furthermore, it has extremely improved adhesiveness to polymethyl methacrylate polymer. Refractive index of said copolymer is low, namely, 1.39 to 1.41 and it is excellent in heat resistance and mechanical strength. Furthermore, melt viscosity of said copolymer may easily be allowed to be close to that of polymethyl methacrylate polymer by suitably changing molecular weight of the copolymer.

Therefore, according to the present invention, it has become possible to provide excellent light transmitting fibers by employing as a sheath component a vinylidene fluoride-tetrafluoroethylene copolymer containing 60 to 80 mol %, preferably 65 to 75 mol % of vinylidene fluoride.

The present invention has firstly made it possible to easily produce fibers excellent in light transmissibility.

The fact that in production of light transmitting fibers the adhesiveness between core component and sheath component and crystallinity of the components have a great influence on light transmissibility of light transmitting fibers will readily be understood from the following experiments.

Polymethyl methacrylate as a core component and vinylidene fluoride polymer as a sheath component were subjected to melt composite spinning at 240°C to produce light transmitting fibers having a diameter of 0.3 mm and a core diameter of 0.27 mm. Thus obtained fibers had considerably high light transmissibility. However, when said fibers were stretched to 1.5 times the original length at 140°C to impart them bending strength, the light transmissibility was considerably decreased. This decrease in transmissibility is considered due to the fact that since adhesiveness between polymethyl methacrylate polymer and vinlyidene fluoride polymer is low, separation of the core and sheath components is apt to occur by stretching and light reflection loss at interface of core and sheath components becomes great to cause reduction in light transmissibility.

Furthermore, when said unstretched fibers were heat treated at 95°C for 30 minutes, crystallization of the sheath polymer markedly proceeded to result in opacification of the fibers and reduction in light transmissibility.

As mentioned above, the sheath component polymer used in the present invention has extremely low crystallinity and is excellent in adhesiveness at interface of core and sheath. Thus, said polymer has an action of extremely decreasing light reflection loss at interface of core and sheath, which markedly improves light transmissibility.

Furthermore, when the copolymer used in the present invention as sheath component has a composition ratio outside the range as specified in the present invention, only such fibers as having extremely low light transmissibility can be obtained because of low adhesiveness and crystallinity.

Moreover, the high heat resistance of the copolymer used in the present invention makes it extremely easy to produce light transmitting fibers. This merit is especially exhibited when melt composite spinning method which uses core-sheath type spinneret is employed. Usually, melt spinning of a polymer mainly composed of polymethyl methacrylate requires a high spinning temperature of 190° to 260°C. Therefore, the sheath component polymer must also be such polymer as capable of sufficiently standing said high temperature.

Ordinary fluorine-containing methacrylic ester polymers (e.g., the polymer having ester component of fluorine-containing alcohol as described in Japanese Pat. No. 8978/68) have some difficulty in resistance to thermal decomposition especially at a temperature of higher than 220°C and are apt to cause foaming due to decomposition during spinning and scattering of light unless temperature is severely controlled. On the contrary, the copolymer used in the present invention does not decompose at a spinning temperature of 190° to 260°C. Thus, it is possible to produce light transmitting fibers under wide spinning conditions. This provides an industrially extremely advantageous method for producing light transmitting fibers.

Furthermore, the copolymer used in the present invention is excellent especially in bending strength and abrasion strength. These characteristics are very important for preventing reduction in light transmissibility caused by mechanical damages of the sheath component polymer after being formed into fibers.

The vinylidene fluoride-tetrafluoroethylene copolymer used as sheath component in the present invention may be produced by conventional methods, for example, by the method disclosed in German OLS 2125350. That is, generally, it may be produced by suspension polymerization or emulsion polymerization usually at a temperature of 20° to 200°C under a pressure of 20 to 200 atm. using redox catalysts or organic or inorganic peroxides as catalyst.

In the present invention, a copolymer containing at least 60 mol %, preferably at least 80 mol %, most preferably at least 90 mol % of methyl methacrylate may also be used as a core component polymer besides polymethyl methacrylate polymer. As the copolymer component, monomers such as acrylic esters, e.g., methyl acrylate, ethyl acrylate, propyl acrylate and butyl acrylate; methacrylic esters, e.g., cyclohexyl methacrylate, benzyl methacrylate, ethyl methacrylate, propyl methacrylate and butyl methacrylate; or styrene may be used. However, it is disired for maintaining light transmissibility or heat dimensional stability of light transmitting fibers that at least 90 mol % of the core component polymer is composed of methyl methacrylate.

The light transmitting fibers of the present invention which have core-sheath structure may be produced by the following two methods in rough classification.

The first method comprises carrying out composite spinning with use of core-sheath type spinneret. A polymer mainly composed of methyl methacrylate as a core component is usually fed in pellet form to spinning machine and in some case it may be used as small spheres or powders. The spun fibers are stretched usually to 1.2 to 2.0 times the original length to impart mechanical properties such as strength and bending resistance.

The melt spinning temperature which somewhat varies depending upon properties of core component polymer and sheath component polymer is usually 190° to 260°C and preferably 210° to 250°C. In order to stably carry out the composite spinning, melt viscosity of the core component polymer is desirably the same as that of the sheath component polymer. This can be attained by suitably selecting control of fluid characteristic of the core component polymer by copolymerization, control of molecular weight of polymers and choice of spinning temperature.

The second method comprises firstly melt spinning a core component polymer alone, then coating thus obtained fibers with a solution of sheath component polymer and thereafter removing solvent of the sheath component polymer.

The coating treatment may be preferably carried out after stretching the spun core polymer from the point of prevention of breakage of filaments or crazing and prevention of damaging of cover film which is the sheath component. However, the coating treatment may be carried out immediately after spinning with great care to increase producibility.

Examples of solvents for preparation of solution of sheath component polymer are acetone, ethyl acetate, dimethylacetamide, dimethylsulfoxide, etc., and mixtures thereof. Especially when ethyl acetate is used as solvent, there are substantially no effects on core component (occurrence of cracks, etc.) and moreover there occurs no opacification phenomenon of surface caused by moisture absorption and thus coating treatment can be stably effected.

Regarding concentration of the polymer solution, any concentrations may be employed if the polymer is homogeneously dissolved. However, for uniform adhesion of the sheath component to the core component and easy removal of solvent, the concentration is preferably 10 to 60 % by weight, more preferably 25 to 45 % by weight.

FIG. 1 is a rough sketch which illustrates one embodiment of the method for coating a concentrated solution of sheath component polymer on filamentary core component polymer. The filamentary core component polymer 1 which has passed through concentrated solution 2 of sheath component polymer kept above a dies is continuously taken out from the dies, whereby the sheath component polymer is coated in a constant thickness on the core component polymer. Thereafter, solvent is removed by a suitable method (e.g., by heating at a constant temperature) to obtain light transmitting fibers having core-sheath structure.

Figure 2A:
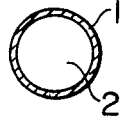
Figure 2B:
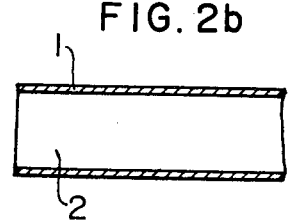

FIG. 2a is a cross sectional view of the light transmitting fibers of the present invention and FIG. 2b is a side sectional view thereof wherein 1 is a sheath component and 2 is a core component.

The great characteristic of the present invention resides in using a copolymer of vinylidene fluoride and tetrafluoroethylene in an appropriate ratio as a sheath component polymer in production of light transmitting fibers having core-sheath structure. This characteristic of the present invention makes it possible to form fibers under wide conditions and to give excellent properties which have never been possessed by the conventional plastic light transmitting fibers, such as high light transmissibility, bending strength, and abrasion strength of fiber surface. Thus, the light transmitting fibers of the present invention have extremely high industrial value.

The present invention will be explained in more detail by the following Examples. In these Examples, the value $k$ which indicates light transmissibility is a coefficient of absorbance obtained in accordance with the method disclosed in Japanese Pat. No. 8978/68, namely, in accordance with the following formula by using a tungsten lamp as light source and measuring intensity I of light after coming out from light transmitting fibers having different length l, respectively.

$$I = I_o e^{-kl}$$

[wherein $l$ is the length (cm) of the light transmitting fibers and $I_o$ is the intensity of light entering into fibers].

Therefore, the smaller value $k$ means better light transmissibility.

Melt index (MI value) which shows melt characteristics of polymers was measured in accordance with the method mentioned in ASTM D-1238-57T under the following conditions.

| Temperature | 220°C or 240°C |
|---|---|
| Load | 10.19 kg |
| Nozzle | length 8 mm diameter of hole 2 mm |

EXAMPLES 1–3 AND COMPARATIVE EXAMPLES 1–4

A polymer (having a MI value of 18 at 240°C and refractive index of 1.49) mainly composed of polymethyl methacrylate and containing 5 mol % of methyl acrylate and being produced by suspension polymerization method as core component and a copolymer of vinylidene fluoride and tetrafluoroethylene as sheath component were composite spun at 240°C with use of core-sheath type spinneret and the resultant filaments were taken up at a speed of 40 m/min and were stretched to 1.5 time the original length at 140°C to obtain final light transmitting fibers having a diameter of 0.30 mm and a core diameter of 0.27 mm.

Table 1 shows relation between composition ratio of vinylidene fluoride (VF) and tetrafluoroethylene (TFE) in copolymer of sheath component and value $k$ which shows light transmissibility. The comparative Examples show the use of copolymers having the composition ratio outside the range of the present invention.

Table

| Examples | VF/TFE(molar ratio) of copolymer | Refractive index of copolymer | MI value of copolymer | Value k of fibers (cm$^{-1}$) | Note |
|---|---|---|---|---|---|
| Example 1 | 80/20 | 1.41 | 13 | 11 × 10$^{-3}$ | Fibers had markedly |

Table-continued

| Examples | VF/TFE(molar ratio) of copolymer | Refractive index of copolymer | MI value of copolymer | Value k of fibers (cm$^{-1}$) | Note |
| --- | --- | --- | --- | --- | --- |
| Example 2 | 70/30 | 1.40 | 15 | $8 \times 10^{-3}$ | excellent light transmissibility |
| Example 3 | 60/40 | 1.39 | 10 | $10 \times 10^{-3}$ | |
| Comparative Example 1 | 100/0 | 1.42 | 12 | $24 \times 10^{-3}$ | Fibers were opacified due to crystallization of sheath component polymer and adhesiveness was also low |
| Example 2 | 90/10 | 1.42 | 16 | $20 \times 10^{-3}$ | |
| Example 3 | 55/45 | 1.38–1.39 | 8 | $22 \times 10^{-3}$ | |
| Example 4 | 40/60 | 1.37–1.38 | 6 | — | Fibers had substantially no light transmissibility |

As is clear from the Table, when content of vinylidene fluoride in the sheath component copolymer was 80 to 60 mol %, the fibers obtained had a remarkably excellent light transmissibility. When the content of vinylidene fluoride was more than and less than said range, the sheath component polymer is crystallized to result in opacification of fibers and extreme reduction in light transmissibility. Furthermore, when content of vinylidene fluoride is 40 mol %, the adhesiveness to core component polymer was extremely reduced and the sheath component was easily separated by hand. Thus, substantially no light transmissibility was recognized due to crystallization of the sheath component polymer and the reduced adhesiveness between the sheath and core components.

EXAMPLE 4

A polymer (having a MI value of 26 at 240°C) mainly composed of methyl methacrylate and containing 10 mol % of methyl acrylate as a core component and a vinylidene fluoride and tetrafluoroethylene copolymer used in Example 2 which contained 70 mol % of vinylidene fluoride as a sheath component were composite spun at 240°C and the resultant filaments were taken up at a speed of 30 m/min. Furthermore, these unstretched filaments were stretched to 1.5 times the original length at 140°C and finally light transmitting fibers having a diameter of 1.00 mm and a core diameter of 0.95 mm. were obtained.

Thus obtained fibers had a value $k$ of $6 \times 10^{-3}$ cm$^{-1}$ and exhibited very good light transmissibility. Furthermore, they were extremely superior to light transmitting fibers comprising polystyrene and polymethyl methacrylate in bending strength and abrasion resistance of the fiber surface.

EXAMPLE 5

Using polymethyl methacrylate polymer (having a MI value of 14 at 220°C) as a core component and a tetrafluoroethylene-vinylidene fluoride copolymer containing 65 mol % of vinylidene fluoride as a sheath component, light transmitting fibers were produced by coating method.

That is, said polymethyl methacrylate was extruded at 220°C and the resultant filaments were taken up at 15 m/min. Then, the filaments were stretched to 1.8 times the original length at 140°C to obtain fibers having a diameter of 1.00 mm. Then, 35 % solution of the sheath component copolymer in acetic acid was coated onto said fibers using the coating apparatus as shown in FIG. 1 to obtain light transmitting fibers.

Thus obtained light transmitting fibers had a value $k$ of $5.8 \times 10^{-3}$ cm$^{-1}$ and exhibited extremely excellent light transmissibility and were also excellent in bending strength and abrasion resistance.

What is claimed is:

1. Light transmitting fibers having core-sheath structure, which comprises a polymer mainly composed of methyl methacrylate containing at least 60 mol % of methyl methacrylate as a core component and a vinylidene fluoride-tetrafluoroethylene copolymer containing 60 to 80 mol % of vinylidene fluoride as a sheath component.

2. Light transmitting fibers according to claim 1, wherein the sheath component comprises a vinylidene fluoride-tetrafluoroethylene copolymer containing 65 to 75 mol % of vinylidene fluoride.

3. Light transmitting fibers according to claim 1, wherein the core component comprises a polymer mainly composed of methyl methacrylate containing at least 90 mol % of methyl methacrylate.

4. Light transmitting fibers according to claim 1, which are produced by composite spinning the core and sheath components blended in concentric circle state at 190° to 260°C.

5. Light transmitting fibers according to claim 4, wherein the composite spun fibers are oriented by stretching to 1.2 to 2.0 times the original length.

6. Light transmitting fibers according to claim 1, which is obtained by forming the core component polymer into fibers and coating the sheath component polymer dissolved in a solvent on said fibers.

7. Light transmitting fibers according to claim 6, wherein the solvent is ethyl acetate.

8. A method for producing light transmitting fibers which comprises composite spinning a polymer mainly composed of methyl methacrylate containing at least 60 mol % of methyl methacrylate as a core component and a vinylidene fluoride-tetrafluoroethylene copolymer containing 60 to 80 mol % of vinylidene fluoride and stretching the resultant filaments to 1.2 to 2.0 times the original length.

9. A method for producing light transmitting fibers which comprises coating the sheath component copolymer of vinylidene fluoride and tetrafluoroethylene containing 60 to 80 mol % of vinylidene fluoride which is dissolved in a solvent on the filaments formed from the core component polymer mainly composed of methyl methacrylate containing at least 60 mol % of methyl methacrylate.

* * * * *